(12) United States Patent
Vestergaard

(10) Patent No.: US 7,641,043 B2
(45) Date of Patent: Jan. 5, 2010

(54) LOADING AND UNLOADING APPARATUS

(76) Inventor: Martin Vestergaard, Søhøjen 15, Svogerslev, Roskilde, DK (DK) 4000

( * ) Notice: Subject to any disclaimer, the term of this patent is extended or adjusted under 35 U.S.C. 154(b) by 85 days.

(21) Appl. No.: 10/594,383

(22) PCT Filed: Mar. 26, 2004

(86) PCT No.: PCT/DK2004/000214

§ 371 (c)(1),
(2), (4) Date: Jul. 11, 2007

(87) PCT Pub. No.: WO2005/092706

PCT Pub. Date: Oct. 6, 2005

(65) Prior Publication Data

US 2008/0118337 A1 May 22, 2008

(51) Int. Cl.
B65G 21/10 (2006.01)
B64F 1/32 (2006.01)

(52) U.S. Cl. ............. 198/592; 198/369.2; 198/312; 198/314; 198/535; 198/538; 198/562; 198/812; 193/35 R

(58) Field of Classification Search .......... 198/369.2, 198/309, 312–314, 535, 536, 538, 560, 562, 198/812; 193/35 R; 414/398

See application file for complete search history.

(56) References Cited

U.S. PATENT DOCUMENTS

| 2,870,922 | A | * | 1/1959 | Thomson | 414/792 |
| 3,651,963 | A | * | 3/1972 | McWilliams | 414/789.8 |
| 3,717,263 | A | * | 2/1973 | McWilliams | 414/789.8 |
| 5,718,325 | A | * | 2/1998 | Doster et al. | 198/592 |
| 7,150,383 | B2 | * | 12/2006 | Talken | 225/93 |
| 7,370,753 | B2 | * | 5/2008 | Yang et al. | 198/812 |
| 2004/0033126 | A1 | | 2/2004 | Thogersen | |

FOREIGN PATENT DOCUMENTS

| DE | 19961349 | 6/2001 |
| EP | 0767126 | 4/1997 |
| WO | WO 98/54073 | 12/1998 |

* cited by examiner

Primary Examiner—Douglas A Hess
(74) Attorney, Agent, or Firm—James Creighton Wray; Meera P. Narasimhan

(57) ABSTRACT

The present invention provides a loading and unloading apparatus comprising in mutual cooperation a conveyor device (3) adjacent a roller table (2), where said conveyor device and roller table are pivotably mounted on a carrying structure (5), which structure, in use is vertically extendable and retractable.

11 Claims, 4 Drawing Sheets

LOADING AND UNLOADING APPARATUS

This application claims the benefit of PCT/DK2004/000214 filed Mar. 26, 2004, which is hereby incorporated by reference in its entirety.

BACKGROUND OF THE INVENTION

The present invention relates to a loading and unloading apparatus as well as a loading and unloading system comprising an apparatus as will be described below.

Although the inventive apparatus and loading and unloading system described in the present application may be utilised in a number of situations, the invention is especially advantageous for use in places where it is difficult to gain access or use other means for handling goods such as for example loading bays in aircrafts, boats, trains or other vehicles. That is to say that the invention is particularly advantageous for use in theses situations, but the inventive concept should not be limited as the invention may be used advantageously in other connections as well.

Within this application, loading and unloading of aircraft bays will be used as a descriptive example but again the invention is not limited for this use and does comprise a number of advantageous features which are applicable to a variety of environments.

Handling of goods, parcels, luggage and the like, hereafter referred to as items, can be a very demanding task for a number of reasons, depending especially on the situation at hand. Personnel loading or unloading such items often have to lift or in other ways manually handle the items, for example onto a conveyor, or carry the items to the conveyor in order for the conveyor to be able to transport the items into or out of storage. In storage facilities, such as warehouses, trucks and containers, although the work may be heavy, the position of the people carrying out the task may be relatively comfortable and, furthermore, wheeled vehicles such as fork lifts and the like may in some instances be used in order to carry and move the items about.

In other instances, especially in cargo holds of trains and in particular of air crafts, the space is extremely limited, whereby the personnel carrying out the transferral of items either from the conveying device into the tightly packaged cargo hold or vice versa often have to be in a rather uncomfortable situations lifting relatively heavy items such as luggage, packages and the like from a kneeling or severely bent-over position. This will eventually lead to injuries and is known to wear cargo personnel down. Furthermore introduction of legislation protecting workers against injuries caused by this type of work in a number of countries has escalated the demand for inventive solutions to this type of problems.

In order to alleviate these problems, a number of solutions have been proposed in the prior art. One of these solutions is the well-known flying carpet, which is installed at the bottom of the cargo hold such that, as an item of luggage or package is introduced into the cargo hold, the items are stacked to the appropriate height and the entire stack is slid on the flying carpet into its final position in the cargo hold. As cargo often is stacked in more layers, the personnel will still have to lift the item from the conveyor onto the stack on the flying carpet and push the stack into its final position in the hold. An additional disadvantage with the flying carpet is that, as it is permanently mounted inside the air craft, the extra weight and space taken up by the flying carpet will be a relatively costly installation for the air craft carrier in the long run.

Additionally, although the flying carpet might be helpful in transporting the items from the opening of the cargo bay to the position where the items will be stacked during transport, it still leaves some manual handling in that the items must be lifted from the conveyor belt into their final position in the stack or in the cargo hull as such.

SUMMARY OF THE INVENTION

It is, therefore, an object of the present invention to provide a loading and unloading apparatus which overcomes these problems as well as providing a complete system which may advantageously be used in order to provide a better and less demanding work environment for the personnel involved.

The present invention addresses this by providing a loading and unloading apparatus comprising in mutual cooperation a conveyor device adjacent a roller table, where said conveyor device and roller table are pivotably mounted on a carrying structure, which structure, in use is vertically extendable and retractable.

The inventive apparatus according to claim 1 makes it possible to receive items for example luggage at one level, change this level by manipulating the apparatus such that the conveying device and roller table due to the vertically extendible and/or retractable structure may be adjusted to a level where it is desirable to unload the luggage item. Ensuring the unloading, the conveying device will transport the item such that all manual interference with the actual placing of the item is limited to manipulate the loading and unloading apparatus into a position where it is desirable to either unload a piece of luggage or to load a piece of luggage unto the conveyor device. In this manner, the manual labour required in order to place an item correctly or remove an item is limited to the actual placing of the item in the stack i.e. next to other items, or removing the item by sliding it onto the tip of the conveyor device. No serious lifting or handling of items is therefore required whereby the impact on personnel carrying out this type of work is severely reduced.

In a further advantageous embodiment of the invention, the conveyor device is tiltable in relation to the plane of the roller table. This embodiment is especially advantageous in that by being able to tilt the conveyor device and not also having to change the level of the entire device, it is possible to speed up operations i.e. as a substantially smaller mass has to be moved, this movement may be carried out much faster than if the mass of the entire device would be altered as would be the case if the level of the loading/unloading plane, i.e. the plane wherein the roller table and the conveyor device are arranged, should change in relation to an item in the stack. By changing the tilt of the conveyor device, it is possible to load and unload items to and from the conveyor device from different levels in the stack. Hereby, a faster operation is provided such that the entire loading and unloading capacity of the apparatus according to the invention is greatly improved.

In order to facilitate this aspect it may be advantageous to provide the surface of the conveyor device with non-slip properties such that items placed on the conveyor device will not have a tendency to slip or slide when the conveyor device is arranged at an angle due to the tilting in relation to the roller table.

In a further advantageous embodiment, the means for extending and retracting the structure comprises hydraulic, electrical, pneumatic means. The means for extending should in this relation be construed as meaning the actual means which creates the movement. It is well-known to use hydraulic, electrical or pneumatic means for example hydraulic jack, pneumatic cylinders or electrical step-motors in order to create movement. When these means are coupled to the structure, a reliable elevating mechanism is created in that for example hydraulic jacks are very reliable in use, and also from a service point of view, it does not require specialists in order to maintain, replace or repair such devices.

In a still further advantageous embodiment, the conveyor device is extendible, between a first retracted position and a second extended position, and that the conveying device may be operational in all positions.

Also this embodiment of the invention provides some inventive advantages in that by being able to extend the conveyor device, it is possible to place items at varying distances from the position of the apparatus. This may be especially important in that by placing the apparatus in a first position by being able to tilt and extend/retract the conveyor device, it is possible to place a number of items at different levels during the stacking of items for example in the cargo bay of an aircraft such that the need to replace the apparatus is minimised whereby the effective production time is increased and therefore the usability of the entire apparatus is greatly improved.

In a still further advantageous embodiment, the vertically extendible and retractable structure is a double scissors structure, and that when the structure is fully retracted the height of the apparatus substantially corresponds to the collapsed scissors structure and the height of the roller table.

The scissor arrangement is especially advantageous in that in the collapsed stage, the space requirement is very limited which provides for a number advantages. Among these is the ability of the apparatus to place items immediately above the floor unto which the apparatus is placed, and secondly, it is possible to store the inventive apparatus at a very limited space due to its collapsible structure such that the overall space requirements in its collapsed position are extremely limited.

This is further improved in a further embodiment where due to the tilting arrangement of the conveyor device, it is possible to completely flip the conveyor device over such that the conveyor device covers the roller table and by at the same time retracting the conveyor device into its most retracted position, the apparatus may be designed such that an ultra compact unit is provided in its most retracted and collapsed position.

Furthermore, the scissor structure may easily be adjusted height-wise by the provision of one or more means for extending and/or retracting the structure such as for example hydraulic rams. The hydraulic rams may, as will be further discussed below, be positioned such that in its collapsed state, they are accommodated within the structure without special space requirements in addition to the space requirements of the structure itself.

In a still further advantageous embodiment of the invention, the carrying structure is arranged on a base, which base is provided with wheels and optionally connection means for a secondary conveying device as well as power supply means for the apparatus, and that the roller table is arranged on a first frame which frame may be rotated in relation to a second frame, where said second frame is fixed to the upper end of the carrying structure, and that said rotation may be powered. By providing the base with wheels for example wheels mounted such that the wheel of course can roll on a substantially horizontal surface but also may pivot about a vertical axis. Easy maneuvering of the apparatus inside the cargo bay is provided such that the apparatus may be placed in the most appropriate position in relation to the work to be carried out.

Further, connection means both for a mechanical coupling with a secondary conveyor system such as for example the conveyor described in the applicant's prior not yet published international patent application PCT/DK2004/000065, and connection means for power supply means may also be provided. In connection with the applicant's prior patent application, it might be advantageous to provide the same kind of power supply and means for driving the different features of the apparatus which are used in connection with the secondary conveying device. In this manner, it is assured that a minimum of power lines are necessary in order to facilitate the loading and unloading of items from or to for example an aircraft.

Turning to the construction of the roller table, the rollers of the roller table are arranged in a first frame which frame may rotate relative to a second frame. The rotation of the first frame in relation to the second frame takes place substantially in a horizontal plane such that it is possible to arrange the rollers with their axis of rotation perpendicular to the desired transport direction of the items to be transported across the roller table. The rollers may be singular rollers arranged adjacent to each other or may be a number of shorter rollers or disks depending on the circumstances. In a preferred embodiment, the rollers extend completely from side to side of the first frame such that one single roller is provided from side to side but a number of rollers may be arranged adjacently in the transport direction in order to provide the roller table with a substantially horizontal transport plane.

Although the device may be made by means of a system of weights, springs and counterweights, is adjusted such that it is possible to manipulate the different features of the device without the use of power means, in a further desired embodiment of the invention, the apparatus comprises power means for example in the shape of hydraulic rams as mentioned above, and further that the apparatus may be manipulated in all three dimensions by a user by operating switches arranged on a housing arranged on the conveyor device or the roller table, where switches are arranged for controlling manipulation means for activating the turning action of the roller table and conveyor device in relation to the carrying structure, controlling the extension/retraction and angle of the conveyor device in relation to the roller table, controlling the elevation of the roller table by activating the support structure, and/or where the conveyor device comprises one or more belts, control the individual relative speed of the one or more belts.

Also in a further advantageous embodiment one or more handles arranged on the housing are connected to a valve means for directing a drive fluid such as air, hydraulic oil or the like to actuators, which actuators power the features of the apparatus.

By being able to control all the features of the apparatus by manipulating switches, a large part of the physical interaction with the items for example luggage has been removed from the process of loading or unloading of the cargo bays. In some embodiments of the invention, it may be advantageous that all the features of the apparatus may be controlled from one control panel by manipulating switches, but for other purposes where the process of moving or removing items is more stereotype as for example when stacking and un-stacking of items, it may be advantageous that only selected features of the apparatus may be directly controlled by its exposed switches. In this manner, it becomes easier for the operator to manipulate the device and the risk of activating the wrong feature is minimised.

In some embodiments of the invention, the conveyor device may advantageously be equipped with two parallel conveying belts making up the conveyor device transport surface. By being able to adjust the relative speed of the two conveyor belts arranged in parallel, it may be possible to align for example luggage placed at an angle on the conveying surface such that as the luggage reaches the roller table, the luggage has been aligned with the general direction of transport.

Furthermore, in the embodiments where the conveyor device is in the shape of an extendible/retractable device, the conveyor belts may advantageously be made from a highly flexible material such that it is possible within the conveyor device to accommodate the slack within the conveyor belt when the conveying device is in its retracted position.

In a still further advantageous embodiment, the switches are arranged in one or more handles arranged on the housing, such that manipulation of the handle influences the switches which may activate and control all or selected manipulation means, such that the handles are comparable to joy-stick means. In this embodiment, a very convenient handling of the apparatus is provided for in that the personnel using the apparatus by manipulating the handle only will be able to change the position, tilt, etc of the apparatus such that it will be positioned in the most appropriate position relative to the stacking of the items. For convenience more than one "joy-stick" handle may be provided such that it is possible for personnel using the apparatus to maneuver and control the apparatus from either side of the apparatus.

The invention also provides a loading and unloading system comprising an apparatus as described above which apparatus is connected to a conveying device for conveying goods, luggage, parcels or the like wherein the conveying device comprises a plurality of conveying elements, where each conveying element comprises a chain box element in which at least one transport roller is rotatably fixed such that rollers arranged in adjacent conveying elements define the conveying device transport plane, and that chain box elements of adjacent conveying elements are interconnected in such a way that one conveying element may articulate in relation to adjacent conveying elements, and that at least some of the chain box elements in the conveying device comprise drive means directly engaging and rotating the transport rollers. Thereby, it is facilitated that a complete system i.e. for transporting the items from a loading bay opening to the actual loading position is facilitated.

The apparatus as discussed above must by the nature of the work which it is designed to carry out be very flexible and fast in its movement in order to accommodate the stacking of items. This in turn means that the vertically extendible and retractable structure must be able to do so at an appropriate speed such that for example suitcases transported on the secondary conveying device will quickly be elevated by the apparatus to the desired height whereby unloading of the suitcase may take place. Hereafter, the apparatus must vertically retract in order to receive the following suitcase etc. and etc.

The invention will now be explained with reference to the accompanying drawings where in

DETAILED DESCRIPTION OF THE PREFERRED EMBODIMENTS

Figure 1:
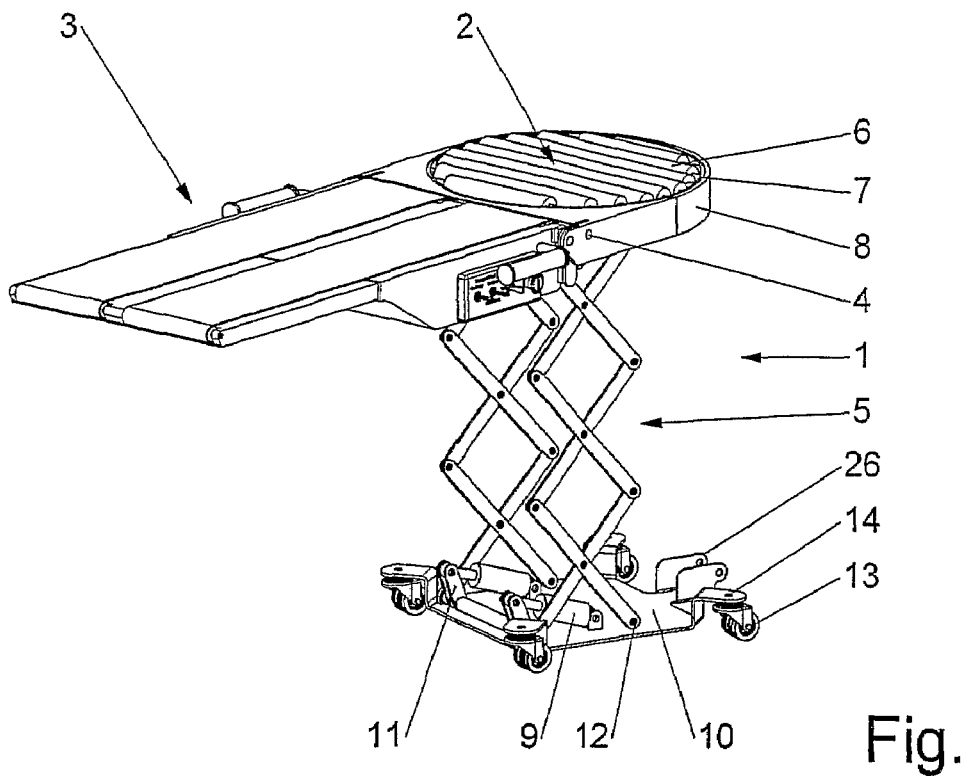
FIG. 1 illustrates the apparatus with its conveyer device in extended position.

In FIG. 1, an apparatus 1 according to the invention is illustrated. The apparatus comprises a roller table 2 arranged adjacent to a conveyor device 3. The conveyor device 3 is pivotably mounted to the roller table 2 in this embodiment by a hinge like construction 4. It should, however, be noted that any other suitable manner of hingely connecting these two elements such that the conveyor device 3 may tilt or pivot in relation to the roller table 2 may be utilised within the scope of the invention.

The roller table 2 and the associated conveyor device 3 are pivotably mounted on the carrying structure 5.

The pivotal arrangement may be in the shape of a first frame 7 wherein the rollers 6 of the roller table 2 are arranged. The first frame 7 is arranged inside a second frame 8 such that the first and second frames 7,8 may relatively be displaced in a plane parallel to the transport plane of the roller table 2. In this manner, it is possible to direct the conveyor device into any horizontal direction relative to the carrying structure 5 without having to adjust the position of the carrying structure 5.

In the illustrated embodiments, the carrying structure is in the shape of a scissors arrangement 5 connected to hydraulic rams 9. The hydraulic rams 9 are coupled to a base plate 10 in one end and to a lever arm arrangement 11 in the opposite end. By extending the hydraulic rams 9, the lever arms will be forced in one direction whereby through a coupling to the scissors arrangement 5, this force will change the relative angles between the arms of the scissors whereby the height level of the roller table 2 will be altered. A free arm 12 of the scissor arrangement may slide in a rail structure (not illustrated).

The base structure may further be provided with wheels 13 which advantageously may be so-called castor wheels which are able to pivot about a vertical axis 14 whereby the apparatus according to the invention is highly maneuverable in the horizontal plane.

Figure 2:
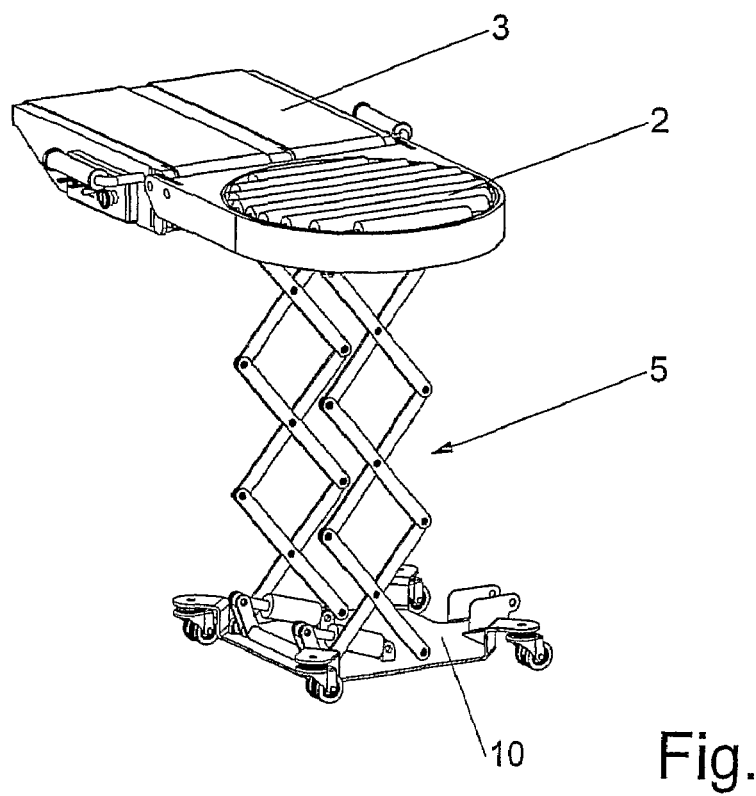
FIG. 2 illustrates the apparatus with the conveyor device in its retracted position.

In FIG. 1, the conveyor device 3 is illustrated in its extended position whereas in FIG. 2 the conveyor device is in its retracted position. As will further be noticed between FIGS. 1 and 2, the roller table as well as the conveyor device have been pivoted in a horizontal plane in relation to the carrying structure 5.

Figure 3:
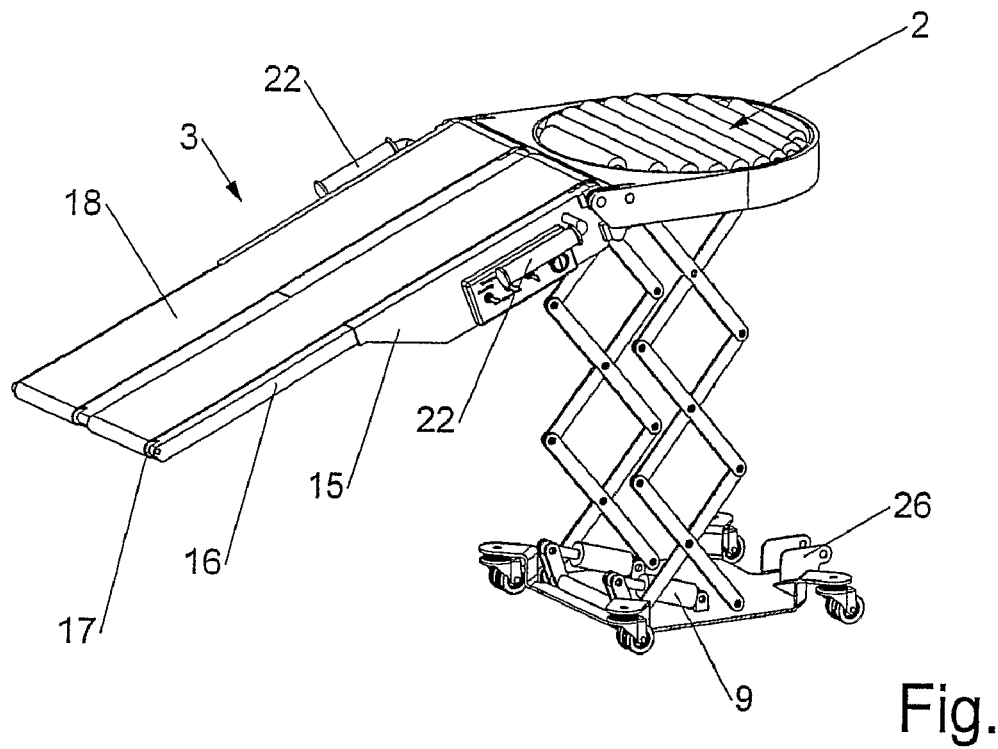
FIG. 3 illustrates the tilting movement of the conveyor device relative to the roller table.

FIG. 3 illustrates the apparatus where the conveyor device 3 has been tilted in relation to the transport plane of the roller table 2. Furthermore, the conveyor device is in its extended position. This extended position is achieved by integral with the base structure 15 of the conveyor device 3 is an extendible panel 16 which comprises a set of rollers 17 around which the endless belt 18 is made to turn.

Figure 4:
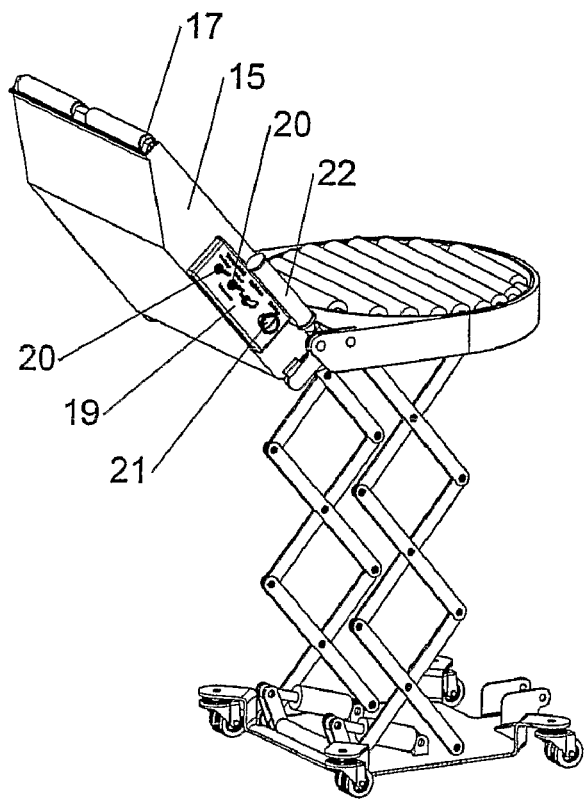
FIG. 4 illustrates the tilting movement of the conveyor device relative to the roller table.

In the retracted position, the panel 16 is substantially completely enclosed in the base structure 15 as illustrated in FIG. 4. In order to be able to deliver items travelling on the conveyor device 3, the rollers 17 are exposed in order to allow free delivery or pick up of these items. In FIG. 4, is also illustrated a control panel 19 comprising a number of switches 20 as well as an emergency stop 21 which may be manipulated by a user.

In all the illustrated embodiments, handles 22 have been provided adjacent to the control panel 19.

As an alternative to the control panel, the switches 20 could be built into the handle 22 such that as the handle 22 is moved to one or the other side, up or down, and/or twisted this movement will influence one or more switches and thereby activate the means for pivoting the transport plane of the conveyor device 3 and the roller table 2 or the elevation of the roller plane 2 by activation of the hydraulic rams 9 or any other desired feature. In this manner, the handles 22 may act as joysticks such that the input to the apparatus is given by manipulation of the handles 22.

The handles 22 may alternatively by the operating member in a hydraulic multi-valve switch. By manipulating the handle, the multi-valve will direct hydraulic fluid to the respective actuators which will effect the actual movement of the relevant part of the apparatus.

The hydraulic multi-valve switch solution is advantageous in that it is both relatively simple to install and operate. The mode of operation for a user, both with respect to the electrical switch embodiment described above and the hydraulic switch is fairly self-explanatory and does therefore not require special skills by the user.

Furthermore, the hydraulic switch construction is robust, low weight and does only require a minimum of space—all important characteristics when it comes to the usability of the apparatus.

In this manner, the manipulation of the apparatus as well as the different features of the apparatus may be controlled by mechanical, hydraulic, electrical or pneumatic means, either alone or in contribution such as for example mechanical/hydraulic, electrical/hydraulic, etc.

Figure 5:
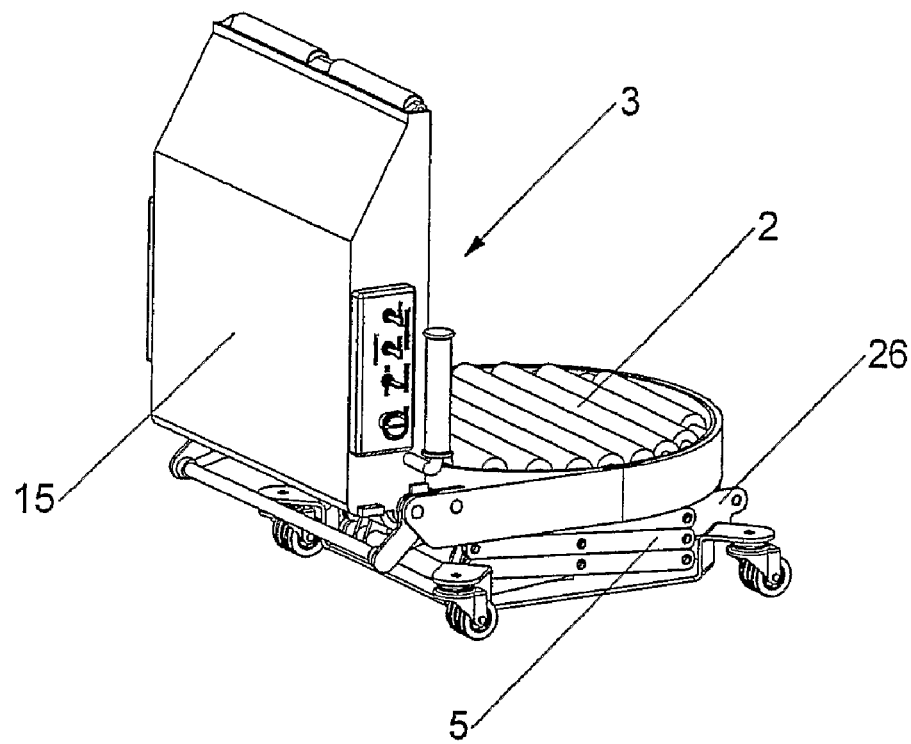
FIG. 5 illustrates the apparatus with the vertically retractable structure in its most retracted position.

Turning to FIG. 5, the vertically extendible and retractable structure 5 in the shape of a scissor structure is illustrated in a completely collapsed position. The hydraulic rams 9 are arranged in the space between the two scissor arrangements 5 and completely covered by the roller table 2. The base structure 15 of the conveyor device 3 is in a vertical position being prepared for being closed on top of the roller table 2 as illustrated in FIG. 6.

Figure 6:
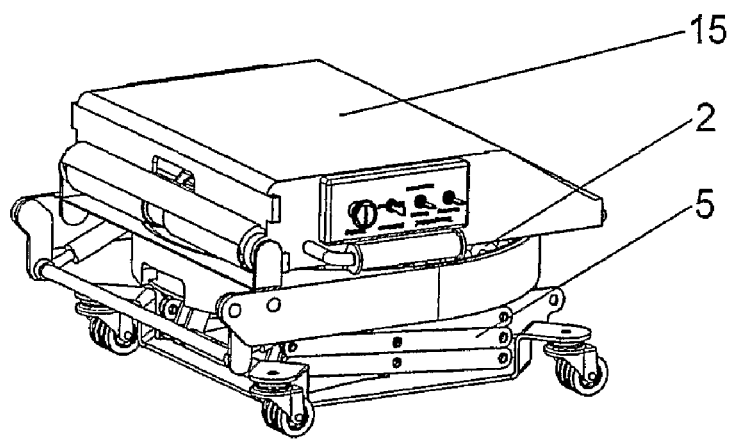
FIG. 6 illustrates the complete compact apparatus ready for storage.

In FIG. 6, the base structure 15 of the conveying device 3 is completely pivoted on top of the roller table 2, and the scissor structure 5 is completely collapsed. In this folded down and collapsed position, the apparatus is very handy to transport and store as it takes up very little space in comparison to when fully extended as illustrated in FIG. 1 illustrating its working position.

Figure 7:
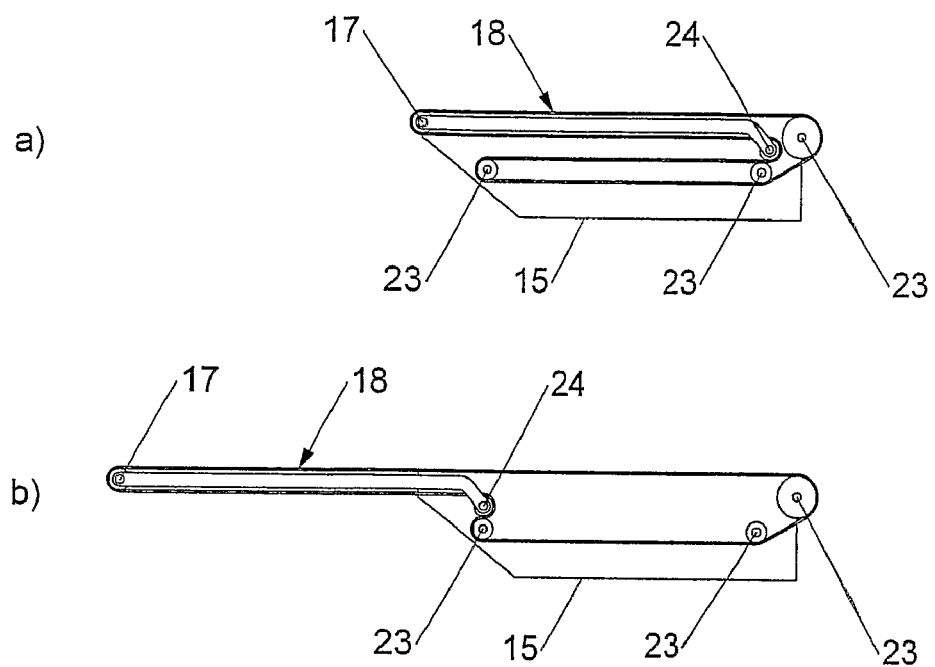
FIG. 7 illustrates one embodiment of the construction of the extendable conveyor device.

In FIGS. 7a, b and c, different embodiments of how the conveyor device 3 could be constructed are illustrated. The base structure 15 in addition to comprising the electrical means for controlling the features of the inventive apparatus also comprises a number of rollers 23,24. The rollers indicated with reference number 23 are stationary rollers whereas the rollers 24 are arranged such that they will move. In FIG. 7b, the conveyor device 3 is illustrated in its extended position. As the conveyor device 3 moves from the extended to the retracted position by pulling back the element 16, the slack in the belt 18 is compensated by moving the rollers 24 such that the conveying belt 18 always is provided with the correct tension for optimal operation. It should, however, be noted that the illustrations in FIG. 7 are only illustrative, and that other arrangements may be found to be more advantageous.

Figure 8:
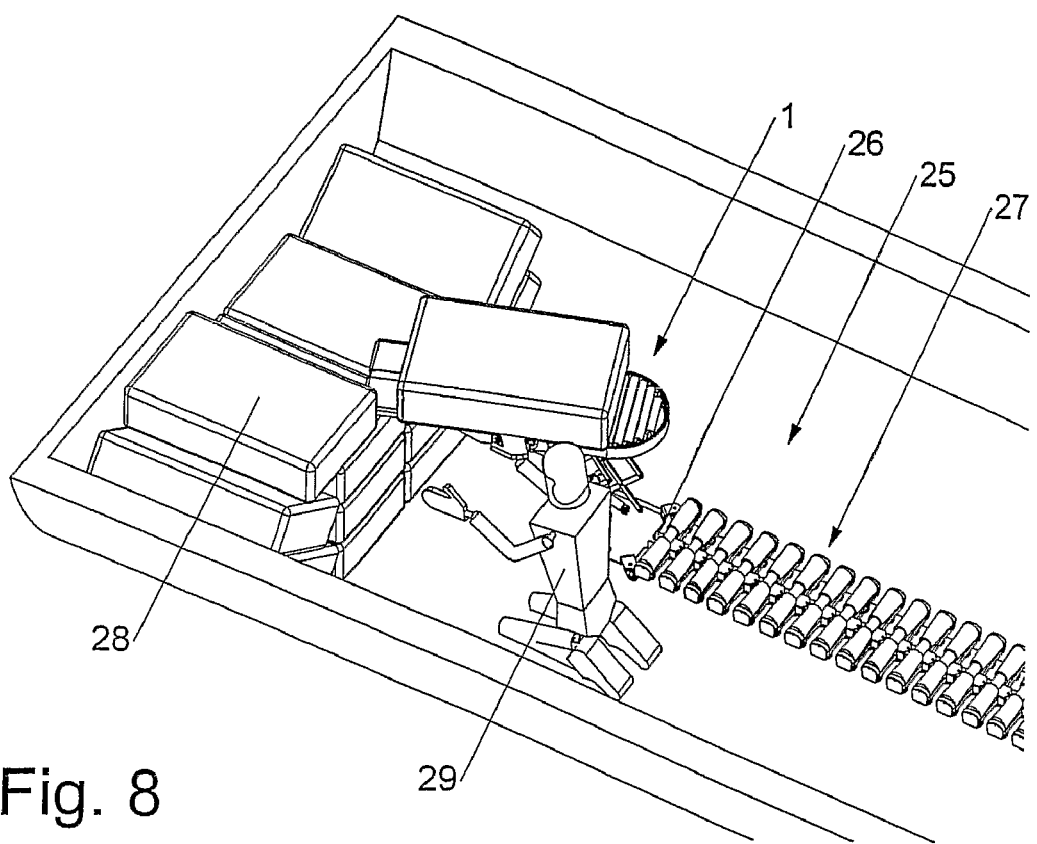
FIG. 8 illustrates a loading and unloading system in use in a cargo hull of an aircraft.

In FIG. 8, a loading and unloading system is illustrated comprising an apparatus 1 according to the invention. The system is illustrated as being arranged in a cargo hull 25 of an aircraft. The apparatus 1 according to the invention is connected by connection means 26 to the conveying device 27.

In an illustrated embodiment, the conveying device 27 is of the type described in the applicant's prior patent application PCT/DK04/000065 which hereby is incorporated by reference into the present application, but any type of flexible conveying device may be used in connection with the inventive system, according to the present invention.

The items 28, in this case illustrated as rather large pieces of luggage or packages, are placed in the bottom of the cargo hull 25. The operator 29 will manipulate the apparatus 1 according to the invention by controlling the features of the apparatus as described above either by means of using the handle as a joystick or by manipulating the switches as has been described above.

As both the conveying device 27 as well as the apparatus 1 according to the present invention are powered, very limited manual labour is left in the cargo hull. This manual labour may be limited to final adjustments of the items 28 such that a neat stacking is achieved, but the overall handling of the items 28 is, due to the inventive features and advantages of the present invention, substantially completely eliminated due to the provision of the conveying device 27 and apparatus 1 as described above.

Although the invention has been described above comprising roller tables and conveyor belts as well as the scissor structure for elevating the roller table into the desired elevation, other means such as for example coaxially arranged cylinders which may be hydraulically operated in order to elevate the roller table in relation to the surface onto which the base of the apparatus has been placed, or any other suitable means may be applied to the apparatus without departing from the scope of the present invention which should only be limited by the appended claims.

The invention has been described and depicted in a prototype embodiment. It is however clear that in use the apparatus will be provided with appropriate security and safety measures such as for example a covering around the vertical extendable and retractable structure, emergency stops and other safety arrangements.

The invention claimed is:

1. Loading and unloading apparatus comprising in mutual cooperation a conveyor device adjacent a roller table, where said conveyor device and roller table are pivotably mounted on a carrying structure, which structure, in use is vertically extendable and retractable, wherein the apparatus may be manipulated in all three dimensions by a user by operating switches arranged on a housing arranged on the conveying device or the roller table, where switches are arranged for controlling manipulation means for activating the turning action of the roller table and conveying device in relation to the carrying structure, controlling the extension/refraction and angle of the conveying device in relation to the roller table, controlling the elevation of the roller table by activating the support structure, and/or where the conveying device comprises one or more belts, and controlling the individual relative speed of the one or more belts.

2. Apparatus according to claim 1 characterised in that the conveyor device is tiltable in relation to the plane of the roller table.

3. Apparatus according to claim 1 characterised in that the means for extending and retracting the structure comprises hydraulic, electrical and/or pneumatic means.

4. Apparatus according to claim 1 characterised in that the conveyor device is extendable, between a first retracted position and a second extended position, and that the conveying device may be operational in all positions.

5. Apparatus according to claim 1 characterised in that the vertically extendable and retractable structure is a double scissors structure, and that when the structure is fully retracted the height of the apparatus substantially corresponds to the collapsed scissors structure and the height of the roller table.

6. Apparatus according to any of claim 1 characterised in that the carrying structure is arranged on a base, which base is provided with wheels and optionally connection means for a secondary conveying device as well as power supply means for the apparatus, and that the roller table is arranged on a first frame which frame may be rotated in relation to a second frame, where said second frame is fixed to the upper end of the carrying structure, and that said rotation may be powered.

7. Apparatus according to claim 1, characterised in that the switches are arranged in one or more handles arranged on the housing, such that manipulation of the handle influences the switches which may activate and control all or selected manipulation means, such that the handles are comparable to joy-stick means.

8. Apparatus according to claim 1 characterised in that one or more handles arranged on the housing are connected to a valve means for directing a drive fluid to actuators, which actuators power the features of the apparatus.

9. Loading and unloading system, comprising an apparatus according to claim 1, which apparatus is connected to a conveying device for conveying wherein the conveying device comprises a plurality of conveying elements, where each conveying element comprises a chain box element in which at least one transport roller is rotatably fixed such that rollers arranged in adjacent conveying elements define the conveying device transport plane, and that chain box elements of adjacent conveying elements are interconnected in such a way that one conveying element may articulate in relation to adjacent conveying elements, and that at least some of the chain box elements in the conveying device comprise drive means directly engaging and rotating the transport rollers.

10. Loading and unloading system, comprising an apparatus according to claim 9, wherein the conveying comprises conveying goods, luggage, parcels, and combinations thereof.

11. Apparatus according to 8, wherein the drive fluid is selected from the group consisting of air, hydraulic oil, and combinations thereof.

\* \* \* \* \*